M. OEHLER.
MACHINE FOR CUTTING FAT.
APPLICATION FILED JAN. 15, 1914.

1,157,799.

Patented Oct. 26, 1915.
2 SHEETS—SHEET 1.

M. OEHLER.
MACHINE FOR CUTTING FAT.
APPLICATION FILED JAN. 15, 1914.

1,157,799.

Patented Oct. 26, 1915.
2 SHEETS—SHEET 2.

Witnesses:
Inventor
M. Oehler
by
Atty

UNITED STATES PATENT OFFICE.

MAX OEHLER, OF ST. LOUIS, MISSOURI.

MACHINE FOR CUTTING FAT.

1,157,799.  Specification of Letters Patent.  Patented Oct. 26, 1915.

Application filed January 15, 1914. Serial No. 812,311.

*To all whom it may concern:*

Be it known that I, MAX OEHLER, a citizen of Germany, residing at St. Louis, in the State of Missouri, have invented certain new and useful Improvements in Machines for Cutting Fat, of which the following is a specification.

This invention relates to improvements in machines for cutting animal fat, suet and the like into cubes, and its object is to produce a machine that will do the work in a speedy, efficient and uniform manner.

With the foregoing and other objects in view the invention consists in the combination and arrangement of parts to be hereinafter fully described in the following specification, pointed out in the claim and illustrated in the accompanying drawings which form a part of said specification and in which—

Figure 1:
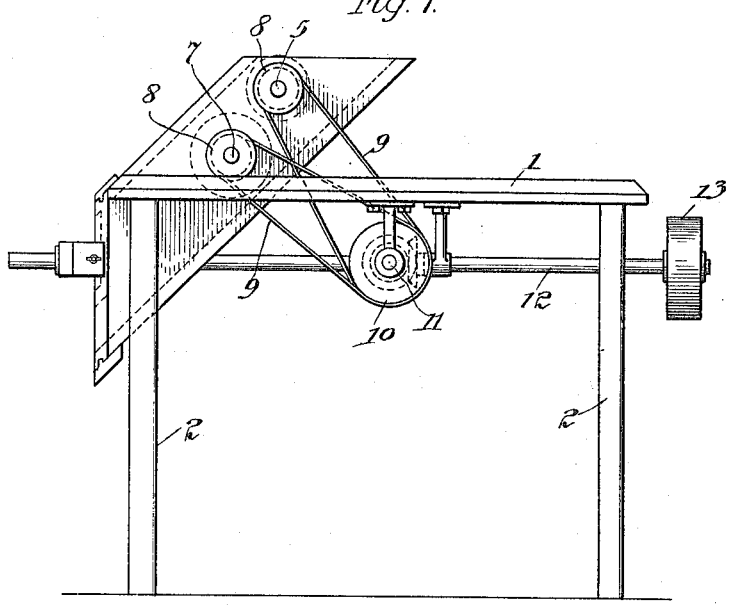
Figure 2:
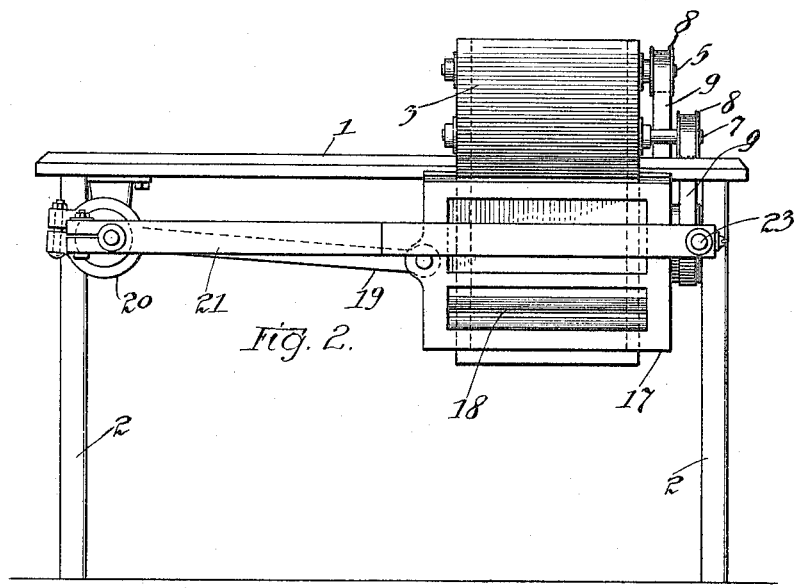
Figure 5:
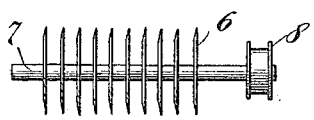
Figure 3:
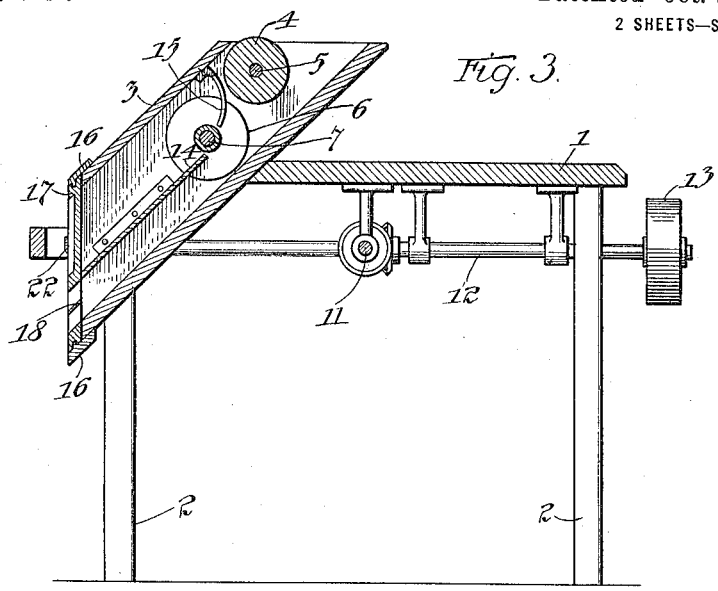
Figure 4:
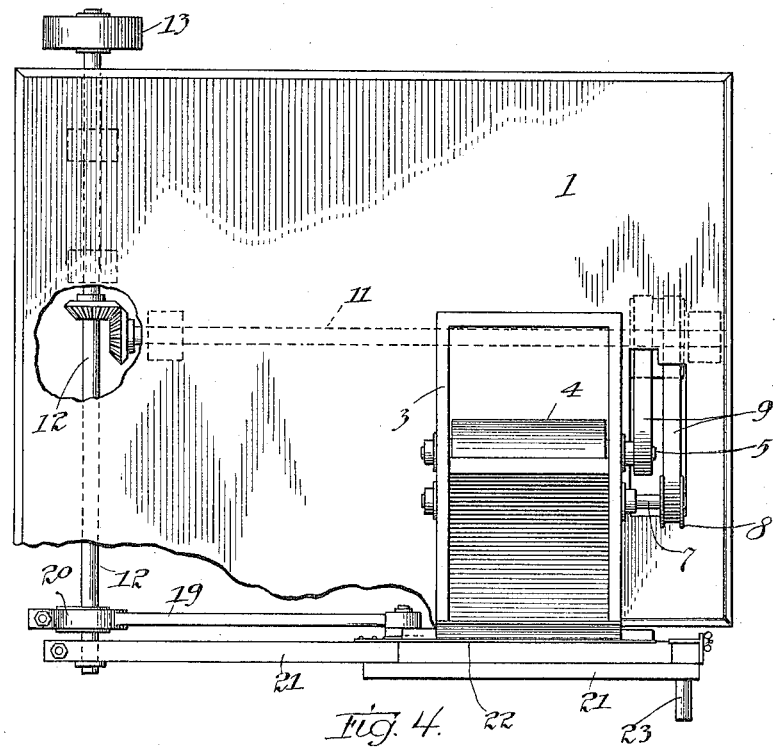

Figure 1 is a side elevation of my improved machine. Fig. 2 is a front elevation of the same. Fig. 3 is a vertical section in side elevation. Fig. 4 is a plan, partly broken away, to better show the movable parts. Fig. 5 is a detail of one series of knives employed.

Like reference characters indicate corresponding parts throughout the several views.

My machine comprises the table 1 that carries the operating mechanism and which is supported upon legs 2 and to said table a hopper 3 is secured which is disposed at an angle of approximately 45 degrees with the horizontal table top and one end of said hopper, which is the fat receiving end, is projected above the top of the table. Within the hopper a rotary cylinder 4 is disposed upon a transverse rotary shaft 5, the purpose of said cylinder being to help feed the fat upon the series of rotary knives 6 secured to another transverse shaft 7 which is journaled in the sides of said hopper and one termination of which shaft is projected beyond said hopper as is also one termination of the shaft 5 and each shaft upon its projected termination is provided with a belt pulley 8 that receives power from one of the belts 9 that are both engaged by a double pulley 10 disposed upon the drive shaft 11 that is gear connected to the main shaft 12, operated by the drive pulley 13. Within the hopper 3 adjacent the knives 6, is a transverse partition 14, which is slotted upon its termination adjacent said knives to permit rotation of the same and which extends to the lower termination of the hopper; the purpose of the partition being to serve as a guide for the fat as the same is cut by and passes beyond said knives. The knives 6 are also provided with guards 15 disposed between them and the cylinder 4, said guards being secured to the top of the hopper.

The lower end of the hopper 3 is provided with cleats 16, 16 in which a reciprocating frame 17 is mounted that is provided with a knife 18 disposed in the plane of movement of the descending fat and said frame is connected by an arm 19 to an eccentric 20, mounted upon the shaft 12 by which it is rotated and so caused to reciprocate the frame 17 and its knife 18. To the end of the shaft one end of another frame 21 is pivoted which carries a knife 22 and said frame at its end remote from the shaft 12 has a handle 23 by which it may be moved upon its pivot. The knife 22 carried by the last named frame is disposed adjacent the outer face of the frame 17 and may be moved up and down in a vertical plane, parallel with the vertical plane of said frame and its purpose is to engage and cut the fat after the same has passed beyond the knife 18 of the frame 17.

In operation the fat or suet is introduced into the end of the hopper, projected above the table top when it may come in contact with the feed cylinder 4 which will tend to force it against the knives 6 which cut it into longitudinal strips after which it passes under the guide 14 and beyond the same to encounter the reciprocating knife 18 by which the said strips are cut horizontally, each strip being cut longitudinally in two pieces in a horizontal plane. Beyond the knife 18 the strips encounter the manually operated knife 22 which cuts them into blocks or cubes of any size desired and they drop into a receptacle (not shown) which may be provided to receive them.

What is claimed is:—

In a meat cutting machine of the type described, an inclined hopper having a gravity feeding action and having arranged therein a longitudinal fixed partition having the corresponding inclination of the hopper to provide a bottom compartment therein for the feeding of the longitudinally split pieces of meat under said partition, rotary cutters hung within said hopper, with their edges peripherally received in slots in the upper edge of said partition, and a reciprocating frame arranged at the lower end of said hopper, said reciprocating frame being equipped with a cutter also positioned in the corresponding inclination of said hopper, and means for actuating said cutters.

In testimony that I claim the foregoing as my own I have hereto affixed my signature in the presence of two subscribing witnesses.

MAX OEHLER.

Witnesses:
AUGUST HAUPTFLEISCH,
JOS. SCHMIDT.